(12) United States Patent
Jansen et al.

(10) Patent No.: US 8,060,941 B2
(45) Date of Patent: Nov. 15, 2011

(54) METHOD AND SYSTEM TO AUTHENTICATE AN APPLICATION IN A COMPUTING PLATFORM OPERATING IN TRUSTED COMPUTING GROUP (TCG) DOMAIN

(75) Inventors: Bernhard Jansen, Rueschlikon (CH); Luke J. O'Connor, Adliswil (CH); Jonathan A. Poritz, Colorado Springs, CO (US); Elsie A. Van Herreweghen, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 1004 days.

(21) Appl. No.: 11/957,408

(22) Filed: Dec. 14, 2007

(65) Prior Publication Data

US 2008/0288783 A1 Nov. 20, 2008

(30) Foreign Application Priority Data

Dec. 15, 2006 (EP) .................................... 06126246

(51) Int. Cl.
*G06F 21/22* (2006.01)
*G06F 12/14* (2006.01)
*H04L 9/32* (2006.01)
*H04K 1/00* (2006.01)

(52) U.S. Cl. ............. 726/30; 726/16; 713/165; 713/179

(58) Field of Classification Search ........................ None
See application file for complete search history.

(56) References Cited

U.S. PATENT DOCUMENTS

| | | | | |
|---|---|---|---|---|
| 6,775,772 | B1 * | 8/2004 | Binding et al. | 713/171 |
| 7,028,149 | B2 * | 4/2006 | Grawrock et al. | 711/156 |
| 7,043,641 | B1 * | 5/2006 | Martinek et al. | 713/187 |
| 7,076,655 | B2 * | 7/2006 | Griffin et al. | 713/164 |
| 7,116,782 | B2 * | 10/2006 | Jackson et al. | 380/251 |
| 7,134,024 | B1 * | 11/2006 | Binding et al. | 713/187 |
| 7,203,841 | B2 * | 4/2007 | Jackson et al. | 713/187 |
| 2003/0084298 | A1 * | 5/2003 | Messerges et al. | 713/176 |
| 2005/0021968 | A1 * | 1/2005 | Zimmer et al. | 713/176 |
| 2005/0108564 | A1 * | 5/2005 | Freeman et al. | 713/200 |
| 2005/0234909 | A1 * | 10/2005 | Bade et al. | 707/8 |
| 2005/0262571 | A1 * | 11/2005 | Zimmer et al. | 726/27 |
| 2005/0283826 | A1 * | 12/2005 | Tahan | 726/2 |
| 2006/0075223 | A1 * | 4/2006 | Bade et al. | 713/162 |
| 2007/0226505 | A1 * | 9/2007 | Brickell | 713/176 |
| 2008/0046752 | A1 * | 2/2008 | Berger et al. | 713/186 |
| 2008/0288783 | A1 * | 11/2008 | Jansen et al. | 713/189 |
| 2009/0041252 | A1 * | 2/2009 | Hanna | 380/278 |
| 2009/0150899 | A1 * | 6/2009 | Tahan | 718/106 |
| 2010/0070800 | A1 * | 3/2010 | Hanna | 714/6 |

* cited by examiner

*Primary Examiner* — Christopher Revak

(74) *Attorney, Agent, or Firm* — Ido Tuchman; William J. Stock

(57) ABSTRACT

A method and system for verifying authenticity of an application in a computing-platform operating in a Trusted Computing Group (TCG) domain is provided. The method includes computing one or more integrity measurements corresponding to one or more of the application, a plurality of precedent-applications, and an output file. The output file includes an output of the application, the application is executing on the computing-platform. Each precedent-application is executed before the application. The method further includes comparing one or more integrity measurements with re-computed integrity measurements. The re-computed integrity measurements are determined corresponding to one or more of the application, the plurality of precedent-applications, and the computing-platform.

28 Claims, 10 Drawing Sheets

METHOD AND SYSTEM TO AUTHENTICATE AN APPLICATION IN A COMPUTING PLATFORM OPERATING IN TRUSTED COMPUTING GROUP (TCG) DOMAIN

CROSS-REFERENCE TO RELATED APPLICATIONS

This application claims priority under 35 U.S.C. §119 to European Patent Application No. 06126246.5 filed Dec. 15, 2006, the entire text of which is specifically incorporated by reference herein.

BACKGROUND OF THE INVENTION

The present invention generally relates to Trusted Computing Group (TCG) domain. More specifically, the present invention relates to verifying authenticity of an application executing on a computing-platform operating in TCG domain.

In a TCG domain, the security state of a computing-platform is attested by using Trusted Platform Module (TPM). TPM supports secure booting and secure reporting of an operational state of the computing-platform. At boot time a Core Root of Trust Measurement (CRTM) computes a hash of itself and of the BIOS and a configuration of the computing-platform, which corresponds to the BIOS and one or more hardware applications executing on the computing-platform. Thereafter, the BIOS computes a hash of a loader of the computing-platform. Then, the loader computes the hash of an operating system loaded on the computing-platform. Additionally, the operating system computes hash of the applications executing on the operating system. After computing each of the aforementioned hashes, a concatenated hash corresponding to each of the aforementioned hashes is stored in one or more Platform Configuration Registers (PCRs) of the TPM. The concatenated hash can be, verified by a verifier to determine authenticity of an operational state of the computing-platform. However, security state of the computing-platform also depends on content of configuration files and output of the applications executing on the computing-platform, which can be tampered by an intruder application.

In conventional applications, software programs are used to verify authenticity of an application and its output. However, the software programs can be tampered by an intruder application executing on the computing-platform.

BRIEF SUMMARY OF THE INVENTION

An objective of the present invention is to provide a method and system, in which authenticity of one or more applications executing on the computing-platform, the output of one or more applications, and the computing-platform is verified efficiently and securely.

Another objective of the present invention is to provide a method and system to execute an incremented attestation of one or more applications executing on the computing-platform.

The above listed objectives are achieved by providing a method and system for verifying authenticity of an application in a computing-platform operating in a Trusted Computing Group (TCG) domain. The method includes computing one or more integrity measurements corresponding to one or more of the application, a plurality of precedent-applications, and an output file. The output file includes an output of the application, the application is executing on the computing-platform. Each precedent-application is executed before the application. The method includes comparing one or more integrity measurements from the Measurement Log (ML) with reference values. The re-computed integrity measurement is determined corresponding to one or more of the application, the plurality of precedent-applications, and the computing-platform. The re-computed integrity measurement is compared to one or more PCRs of a TPM Quote to prove the integrity of the ML.

The above listed method steps are achieved by an Operating System (OS) module, a TPM, and a verifier.

In an embodiment of the present invention, the above listed objectives are achieved by providing a method and a system for verifying authenticity of a computing-platform operating in a Trusted Computing Group (TCG) domain. A plurality of applications are executing on the computing-platform. The method includes computing one or more integrity measurements corresponding to the plurality of applications executing on the computing-platform. The method further includes searching an Attestation List (AL) of the computing-platform to determine if an entry corresponding to a verifier is present in the AL. The AL corresponds to the verifier. Thereafter, an incremented-Measurement-Log (ML) corresponding to a set of applications is computed, if an entry corresponding to the verifier is present in the AL. The incremented-ML comprises an execution history of a set of applications. The plurality of applications include the set of applications. The set of applications is executed on the computing-platform during a pre-determined time period. Further, the method includes comparing one or more precedent hash values of applications, which are represented by the values in the PCR, with recomputed-integrity measurement to ensure the correctness of the ML. The re-computed integrity measurement is computed from the execution history of the set of applications stored in the incremented-ML. Furthermore the hash values from the execution history, which is the ML, are compared to the known trustworthy hash values to ensure the trustworthiness of the computing-platform and the authenticity of an application.

BRIEF DESCRIPTION OF THE SEVERAL VIEWS OF THE DRAWINGS

The foregoing objects and advantages of the present invention for a method and system to authenticate an application in a computing-platform operating in a Trusted Computing Group (TCG) domain may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE INVENTION

Figure 1:
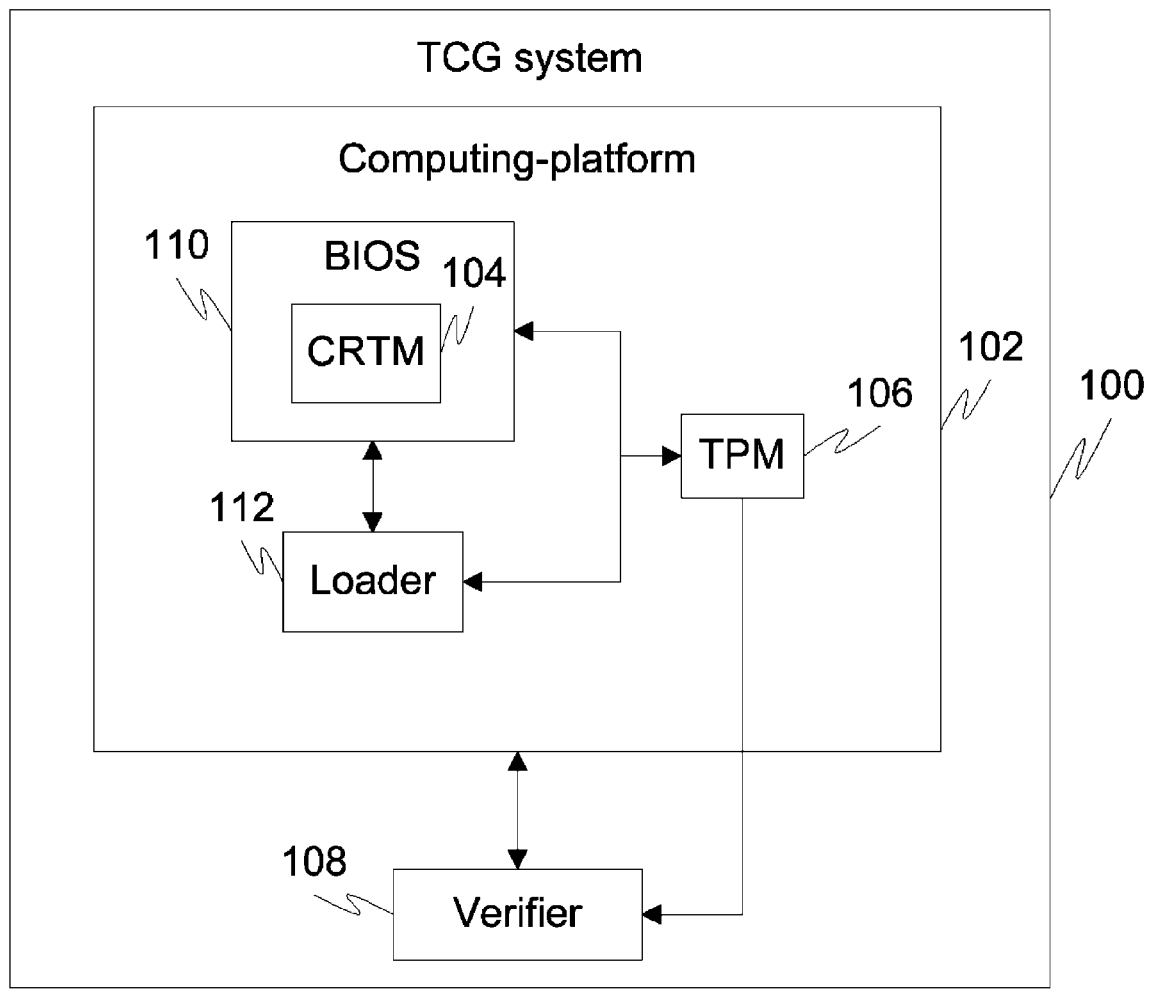
FIG. 1 is a block diagram showing a Trusted Computing Group (TCG) system 100 (that is exemplary) in which various embodiments of the present invention can function.

Before describing in detail embodiments that are in accordance with the present invention, it should be observed that the embodiments reside primarily in combinations of method steps and system components related to a method and system to authenticate an application in a computing-platform operating in a Trusted Computing Group (TCG) domain. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skilled in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. A device or structure that is "configured" in a certain way is configured in at least that way, but may also be configured in ways that are not listed.

Various embodiments of the present invention provide a method and system to authenticate an application in a computing-platform operating in a TCG domain. In the TCG domain, a Trusted Platform Module (TPM) stores integrity measurements for an application executing on the computing-platform. Examples of the application, may include, but are not limited to a software program, a hardware device, and a combination of a software program and a hardware device. The integrity measurements are then verified to confirm the authenticity of the computing-platform and the application.

FIG. 1 is a block diagram of a TCG system 100 (that is exemplary) in which various embodiments of the present invention can function. TCG system 100 includes a computing-platform 102, a Core Root of Trust Measurement (CRTM) 104, a TPM 106, and a verifier 108. Computing-platform 102 includes a BIOS 110, loader 112, CRTM 104 and TPM 106. To attest a security state corresponding to computing-platform 102, each of BIOS 110 and loader 112 communicates with each of CRTM 104 and TPM 106. Further, CRTM 104 communicates with TPM 106, as TPM 106 supports trustworthy booting of computing-platform 102 and secure reporting of an operational state of computing-platform 102.

To support trustworthy and attestable footing of computing-platform 102, CRTM 104 computes a hash of itself and a BIOS-hash of BIOS 110 and BIOS 110 and hardware configuration hash, which corresponds to BIOS 110. CRTM 104 stores the BIOS-hash in one or more Platform Configuration Register, (PCRs) of TPM 106. Thereafter, BIOS 110 computes a loader-hash of loader 112 and stores the loader-hash in one or more PCRs of TPM 106.

Additionally, to support secure reporting of the operational state of computing-platform 102, loader 112 computes an Operating System (OS)-hash of an OS to be loaded on computing-platform 102. Loader 112 then stores the OS-hash in oneTPCRs of TPM_106. The OS loaded on computing-platform 102, further computes hashes of applications before they set executed on computing-platform 102 and stores each hash of the applications executing on computing-platform 102 in one PCRs of TPM 106.

Verifier 108 may request for an attestation of an operational state of computing-platform 102. For this, verifier 108 sends a request with a credential public key, which corresponds to a TPM protected Key, and a nonce to the computing-platform. Thereafter, TPM 106 transmits a TPM-quote and a credential of computing-platform 102 to verifier 108. The TPM-quote includes a snapshot value of one or more PCR, of TPM 106 which is issuing the TPM-quote. The TPM-quote is signed by a TPM-protected key. The credential includes a public key that corresponds to the TPM-protected key. Verifier 108 uses the public key to verify the signature with the TPM-quote with the TPM-protected key to confirm that TPM 106 has generated the TPM-quote. The method and system to authenticate an application in computing-platform 102 operating in a TCG domain is explained hereinafter.

Figure 2:
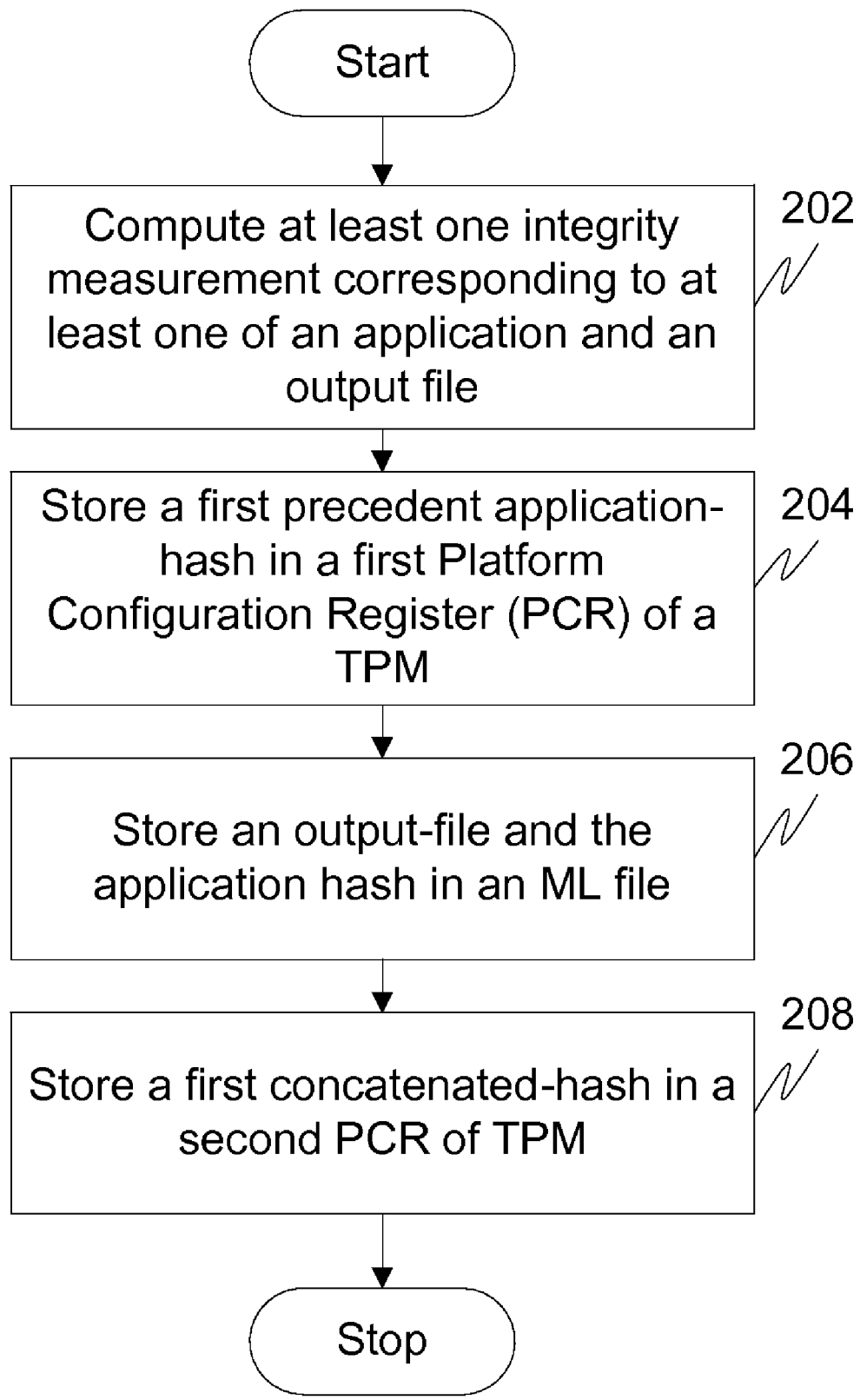
FIG. 2 is a flowchart for computing and store one or more integrity measurements of an application and the output of the application, in accordance with an embodiment of the present invention.

FIG. 2 is a flowchart for computing and store one or more integrity measurements of an application and the output of the application, in accordance with an embodiment of the present invention. In an embodiment of the present invention, one or more integrity measurements include a first precedent application-hash, an application hash, an output-file hash, and a first concatenated-hash. The first precedent application-hash is an accumulated hash corresponding to hashes of the plurality of precedent-application. The hashes of the plurality of precedent applications include, but are not limited to the CRTM hash, the BIOS-hash, the loader-hash, and the OS-hash, and a hash of each application executed before the application. Each of these hashes is written into a specified PCR before the application is executed. The first precedent hash is represented by the value of the PCR which is dedicated to store the computed hashes. For example, the CTRM-hash is H (CRTM). The BIOS-hash is H (B), the loader-hash is H (L) and the OS-hash is H (OS). Further, if n applications have executed before the application, then hashes of applications executed before the application may be represented as H (1), H(2), ..., H (n). The first precedent application-hash is represented as H (H [L]+H (H [B]+H (H (H [CRTM]+0)))) and so on, and is only stored and represented in the dedicated PCR. The application hash gets computed before the application get executed and written to the PCR of the precedent hash. Thereafter, the output-file hash is computed for the output file of the application. The first concatenated-hash is computed corresponding to the output-file hash and the application hash. For example, the application hash is H (A) and the output-file-hash is H (O). Thereafter, the first concatenated-hash is computed as H (H (A)+H (O)).

After computing-platform 102 computes the application-hash and stored it to the PCR by extending the PCR and therefore add it to the first precedent hash, the application is executed and the output of the application is written in the output-file. Thereafter, the application calls a function, of the OS module, to compute the application hash, the output-file hash and the first concatenated-hash. The first precedent application-hash already includes hash of the function called by the application. In an exemplary embodiment of the present invention, the function called by the application is an authenticated measure function. A hash of the authenticated_measure function may be represented as H (AMF). Therefore, in this exemplary embodiment, the first precedent application-hash is represented as H(H[1]+H([AMF]+H(H[OS]+H(H[L]+H(H[B]+H(H(H[CRTM]+0))))) The AM.F can also be part of the OS. An alternative first precedent application hash is represented as H(H[1]+H(H[OS with AMF]+H(H[L]+H(H[B]+H(H(H[CRTM]+0))))).

After computing each integrity measurement, computing-platform 102 stores the application hash and the output-file hash in a ML file. The ML file includes the CRTM-hash, the BIOS-hash, the loader-hash, the OS-hash, hash of each application executed before the application. The ML further includes an index corresponding to each of BIOS 110, loader 112, the OS and each application executed before the application.

Thereafter, computing-platform 102 stores the first concatenated-hash in a second dedicated PCR of TPM 106. Thereafter, verifier 108 receives one or more of a TPM-quote, and the ML file in response to the request generated for verifying authenticity of the application and the output file. TPM 106 generates the TPM-quote. The T'PM-quote includes the first concatenated-hash and the first precedent hash and a nonce out of the TPM-quote request. The TPM-quote is signed by a first TPM-protected key.

In another embodiment of the present invention, one or more integrity measurements are a signed message. TPM 106 generates the signed message. The signed message includes the output of the application. The signed message is signed by a second TPM-protected key. The second TPM-protected key corresponds to a second public-key. The second public-key is securely linked to a set of PCR values in a credential of computing-platform 102. The credential is certified by a third TPM-protected key. The signed message may further include a challenge. The challenge may be a randomly generated value and is unique for each signed message. In an exemplary embodiment of the present invention, the challenge is at least 160 bits long. The challenge is evoked by verifier 108 to the application to verify whether the output of the application is generated after evoking the challenge. This is further explained in detail in conjunction with FIG. 4.

After TPM 106 generates the signed message, verifier 108 receives one or more credentials of computing-platform 102.

One or more credentials of computing-platform 102 include a third public-key, the second public-key and the set of PCR values. The third public-key is signed by an authority key. The second public-key and the set of PCR values are signed by the third TPM-protected key. The third TPM-protected key corresponds to the third public-key. This is further explained in detail in conjunction with FIG. 4.

In an embodiment of the present invention, before comparing one or more integrity measurements from the ML with trust values verifier 108 trusts to confirm the authenticity of the application executing on computing-platform 102, verifier 108 checks the signature from TPM 106 and ensures that the TPM Quote was signed by a first TPM protected key. Afterwards verifier 108 checks if the challenge fits to the one verifier 108 sent. Thereafter, verifier 108 re-computes the ML and compares it to one or more integrity measurements of the TPM-quote to ensure that the ML is a correct and trustworthy state. After testing the correctness of the ML verifier 108 compares the integrity measurements from the execution history obtained from the ML with values verifier 108 trusts.

Thereafter, verifier 108 rehashes the output file to get a second hash of the output file and compares it the first output file hash from the ML. Verifier 108 then compares the first application hash front the ML with values verifier 108 trusts. Verifier 108 then computes a second concatenated hash corresponding to the second output file hash and the first application hash and compares the first concatenated hash from the TPM-quote with the regenerated second concatenated hash to prove the authenticity of the application and the output file.

In another embodiment of the present invention, one or more integrity measurements that include the signed message are verified by verifier 108. This is further explained in detail in conjunction with FIG. 4.

In FIG. 2, at step 202, computing-platform 102 computes one or more of an integrity measurements that include, H(A) corresponding to an application A before initiating it and an application integrity measurement H(A)' after the output file O was written and an integrity measurement H (O) of the output file. The application integrity measurement, H (A) gets extended to the first precedent application-hash which is stored in a dedicated PCR of TPM 106 by concatenating the value of the PCR and the integrity measurement H (A) and the PCR value and compute a hash over it, at step 204. The extend procedure happens inside TPM 106 by the TPM extend function. The application hash A is stored in the ML. After writing the output file. Thereafter, the application calls an OS module to hash the application A again and compute A' and the hash of the output-file O. At step 206, both these hashes are written to the ML and hash module computes a first concatenated hash corresponding to A' and O. For example, the ML file is augmented with the application hash H (A), H (A)' and the output-file hash H (O). In an embodiment of the present invention, in addition to the application hash and the output-file hash, the filename of the application and the file name of the output-file are stored in the ML file. In an exemplary embodiment of the present invention, the ML file is maintained by the authenticated measure function.

Thereafter, at step 208, computing-platform 102 stores the first concatenated-hash in the second PCR of TPM 106. In an embodiment of the present invention, the first concatenated-hash is stored by calling a function. For example, a TPM-extend function is called to store the first concatenated-hash in the second PCR of TPM 106.

In an embodiment of the present invention, the second PCR is a PCR dedicated for storing the first concatenated-hash. In this embodiment of the present invention, as verifier 108 has the ML, which includes hashes of each application executing on computing-platform 102. Therefore, verifier 108 can verify that an application other than the application being verified, cannot store a hash in the second PCR dedicated for storing the first concatenated-hash. Further, as verifier 108 has a list of hashes that correspond to executables or modules that verifier 108 trusts, therefore, verifier 108 can confirm that the application writing the first concatenated hash is authentic. The process of verifying authenticity of the application if the second PCR is a PCR dedicated for storing the first concatenated hash is further explained in conjunction with FIG. 3.

In another embodiment of the present invention, the second PCR used for storing the first concatenated-hash is a non-dedicated PCR. Therefore, each of the first concatenated-hash and the first precedent application-hash are stored in the second PCR in an accumulated form. The process of verifying authenticity of the application if the second PCR is a non-dedicated PCR is further explained in conjunction with FIG. 3.

After computing-platform 102 stores each of the application hash, the output-file hash and the first concatenated-hash, verifier 108 receives one or more of a TPM-quote and the ML file and the output file. This is further explained in detail in conjunction with FIG. 3.

Figure 3:
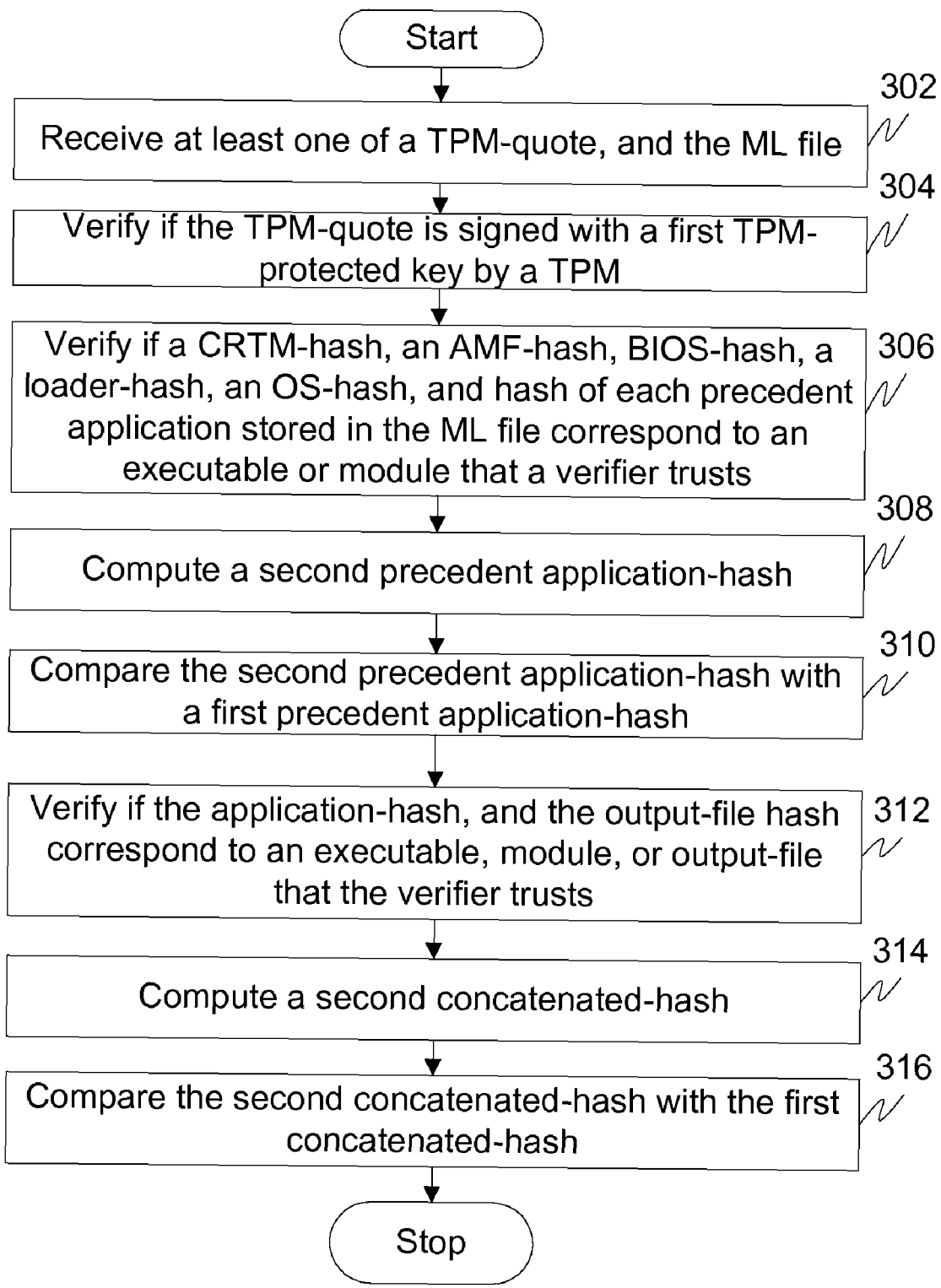
FIG. 3 is a flowchart for checking the trustworthiness of a computing system and the output of an application running on top of a computing-platform, in accordance with an embodiment of the invention.

FIG. 3 is a flowchart for checking the trustworthiness of a computing system and the output of an application running on top of a computing-platform, in accordance with an embodiment of the invention. At step 302, verifier 108 receives one or more of a TPM-quote, and the ML file and one or more output files, in an embodiment of the present invention, if the second PCR of TPM 106 is a PCR dedicated for storing the first concatenate-hash, then the TPM-quote includes the first concatenated-hash and the first precedent application-hash. In another embodiment of the present invention, if the second PCR of TPM 106 is a non-dedicated PCR, then the TPM-quote includes an accumulated form of the first concatenated-hash and the first precedent application-hash. TPM 106 generates and signs the TPM-quote with the first TPM-protected key. The ML file includes the BIOS-hash, the loader-hash, the OS-hash, hash of each precedent application executed before the application that writes the output file the application hash, and the output-file hash.

Verifier 108 uses a first public-key to verify that the TPM-quote is signed with the first TPM-protected key by TPM 106 at step 304. The first public-key corresponds to the first TPM-protected key. The first public-key is certified in one or more credentials of computing-platform 102. Verifier 108 includes one or more credentials of computing-platform 102. Verifying the signing of the TPM-quote with the first TPM-protected key confirms that the TPM-quote is generated by TPM 106.

Thereafter, at step 306, verifier 108 verifies if the CRTM-hash, the BIOS-hash- the loader-hash, the OS-hash, the AMF-hash and hash of each precedent application stored in the ML file correspond to an executable or a module that verifier 108 trusts. Verifier 108 further verifies if a function that is used to compute these hashes corresponds to a function that verifier 108 trusts. For this, verifier 108 compares the CRTM-hash, the AMF-hash, the BIOS-hash, the loader-hash, the OS-hash and hash of each precedent application with a list of authentic hashes. The list of authentic-hashes includes hashes that correspond to applications or modules that verifier 108 trusts. In an embodiment of the present invention, verifier 108 receives the list of authentic hashes from a directory server. The BIOS-hash, the loader-hash, the OS-hash and hash of each precedent application are authentic, if they are present in the list of authentic hashes.

After verifying that the CRTM-hash, the AMF-hash, the BIOS-hash, the loader-hash, the OS-hash and hash of each precedent application stored in the ML correspond to authentic application, at step 308 verifier 108 computes the second precedent application-hash corresponding to BIOS-hash, the loader-hash, the OS-hash and hash of each precedent application stored in the ML. Thereafter the second precedent application-hash is compared with the first precedent application-hash at step 310, if the second PCR of TPM 106 is a PCR dedicated for storing the first concatenate-hash. However, if the second PCR of TPM 106 is a non-dedicated PCR, then verifier 108 separates the first precedent application-hash from the accumulated hash of the first precedent application-hash and the first concatenated-hash using the ML. Thereafter, the step 310 is performed. Therefore, if the second precedent application-hash is equal to the first precedent application, then the operational state of computing-platform 102 is verified. However, if the second precedent application-hash is not equal to the first precedent application, then the operational state of computing-platform 102 is unreliable.

Thereafter, at step 312, verifier 108 verifies if the application hash, and the output-file hash stored in the ML file corresponds to an executable, a module, or an output-files that verifier 108 trusts. For this, verifier 108 compares the application hash and the output-file hash with the list of authentic hashes. If the application hash and the output-file hash are present in the list of authentic hashes, then verifier 108 trusts the application and the output-file. However, if the application hash and the output-file hash are not present in the list of authentic hashes, then the application and the output-file are not authentic.

At step 314, verifier 108 computes the second concatenated-hash from the application hash stored in the ML and the output-file hash. Thereafter, at step 316, the second concatenated hash is compared with the first concatenated hash, if the second PCR of TPM 106 is a PCR dedicated for storing the first concatenate-hash. In another embodiment of the present invention, the second PCR of TPM 106 is a non-dedicated PCR then verifier 108 separates the first concatenated hash from the accumulated hash of the first precedent application-hash by using the ML file. If the second concatenated hash is equal to the first concatenated-hash then verifier 108 confirms that each of the application executing on computing-platform 102 and the output stored in the output-file are authentic, i.e., the application hash is computed for the application and the output-file hash is computed for the output-file storing the output of the application. However, if the second concatenated-hash is different than the first concatenated-hash, then one or more of the application executing on computing-platform 102 and the output stored in the output-file are not authentic. Therefore, the application executing on computing-platform 102 is not authentic.

Figure 4:
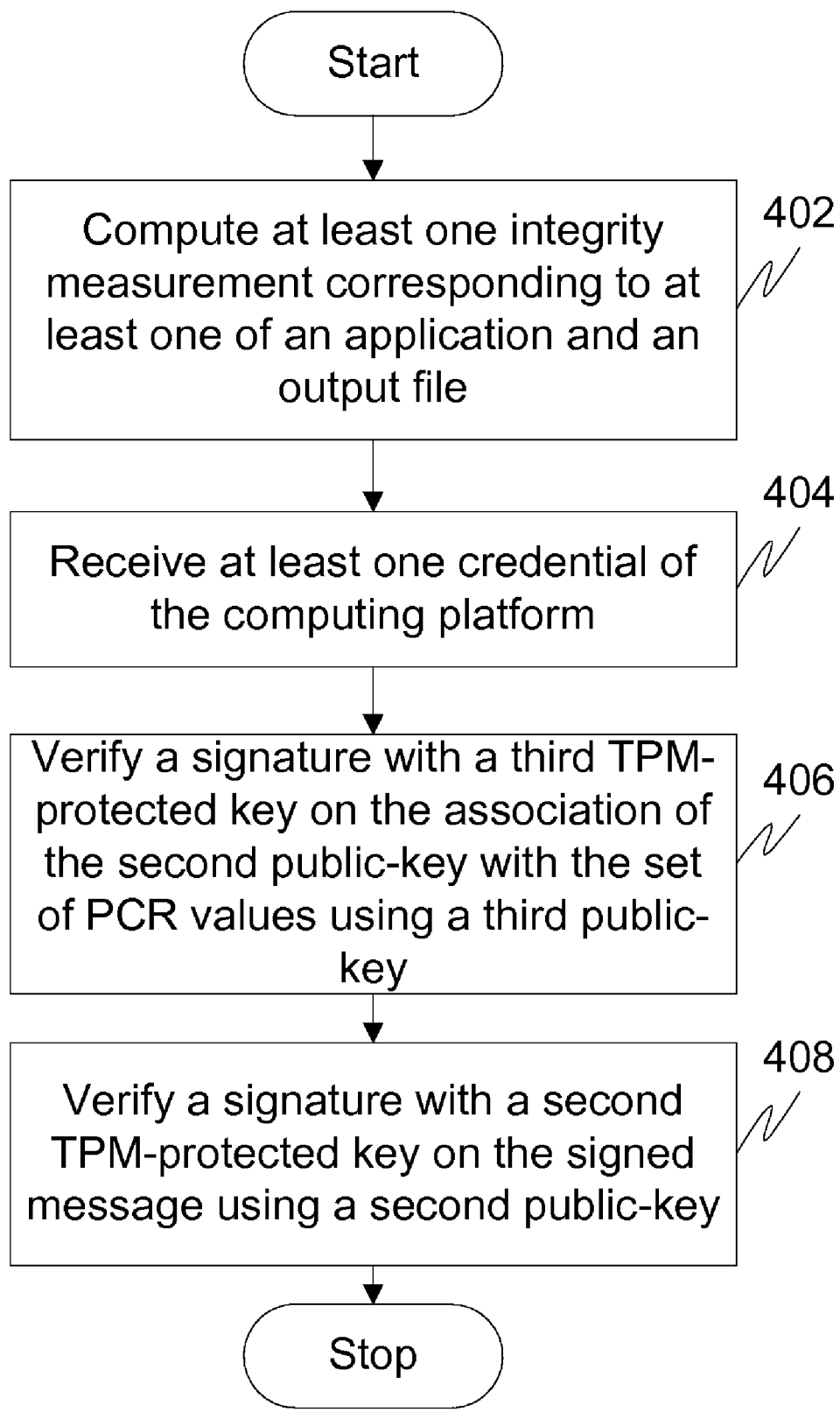
FIG. 4 is a flowchart of a method for verifying authenticity of an application in a computing-platform operating in a TCG domain, in accordance with an embodiment of the present invention.

FIG. 4 is a flowchart of a method for verifying authenticity of an application in a computing-platform 102 operating in a TCG domain, in accordance with an embodiment of the present invention. At step 402, computing-platform 102 computes one or more integrity measurements corresponding to one or more of the application and the output file. One or more integrity measurements are a signed message. The signed message includes the output of the application.

The signed message is signed by a second TPM-protected key. In an exemplary embodiment, the second TPM-protected key is Secret Key (SK) 2. Therefore, the signed message may be represented as: (S_SK2 (Output, challenge)). The second TPM-protected key corresponds to a second public-key. The second public-key is securely linked to a set of PCR values in a credential of computing-platform 102. The credential is certified by a third TPM-protected key. The signed message further includes a challenge. Verifier 108 evokes the challenge to the application to verify whether the output of the application is generated after evoking the challenge. Further, the challenge is evoked before verifier 108 generates the request for verifying authenticity of the application.

After computing-platform 102 computes one or more integrity measurements, verifier 108 receives one or more credentials of computing-platform 102, at step 404. One or more credentials of computing-platform 102 include a third public-key, the second public-key and the set of PCR values. The third public-key is signed by an Authority Key (AK). The second public-key and the set of PCR values are signed by the third TPM-protected key. The third TPM-protected key corresponds to the third public-key. In an exemplary embodiment, the third TPM-protected key is SK3, the second public-key is PK2, the third public key is PK3, and the authority key is AK. Therefore, one or more credentials received by verifier 108 may be represented as: (S_AK (PK3), S_SK3 (PK2, (the set of PCR values))).

Thereafter at step 406, verifier 108 uses the third public-key to verify a signature with the third TPM-protected key on the association of the second public-key with the set of PCR values. The signature on the association of the second public-key with the set of PCR values is verified to confirm the association of the second public-key with the set of PCR values. Therefore, if the third public key verifies the signature with the third TPM-protected key, then the second public-key is associated with the set of PCR. However, if the third public key does not verify the signature with the third TPM-protected key, then the second public-key is not associated with the set of PCR values.

After verifying association of the second public-key with the set of PCR values, at step 408, verifier 108 uses the second public-key to verify a signature with the second TPM-protected on the signed message, which includes the output and challenge. Verifying with the second public-key confirms the signing of the output and the challenge in the configuration of one or more PCRs. The configuration of one or more PCRs correspond to the set of PCR values. Therefore, if the second-public key verifies the signature with the second TPM-protected key on the output and challenge, then it can be verified that the signed message is signed by the second TPM-protected key in the configuration of one or more PCRs. In an embodiment of the present invention, verifying with the second public-key confirms generation of the output after evoking the challenge.

Further, as output and the challenge in the signed message are signed with the second TPM-protected key, therefore, it can be verified that the output of the application is generated after the challenge is evoked to the application.

Figure 5:
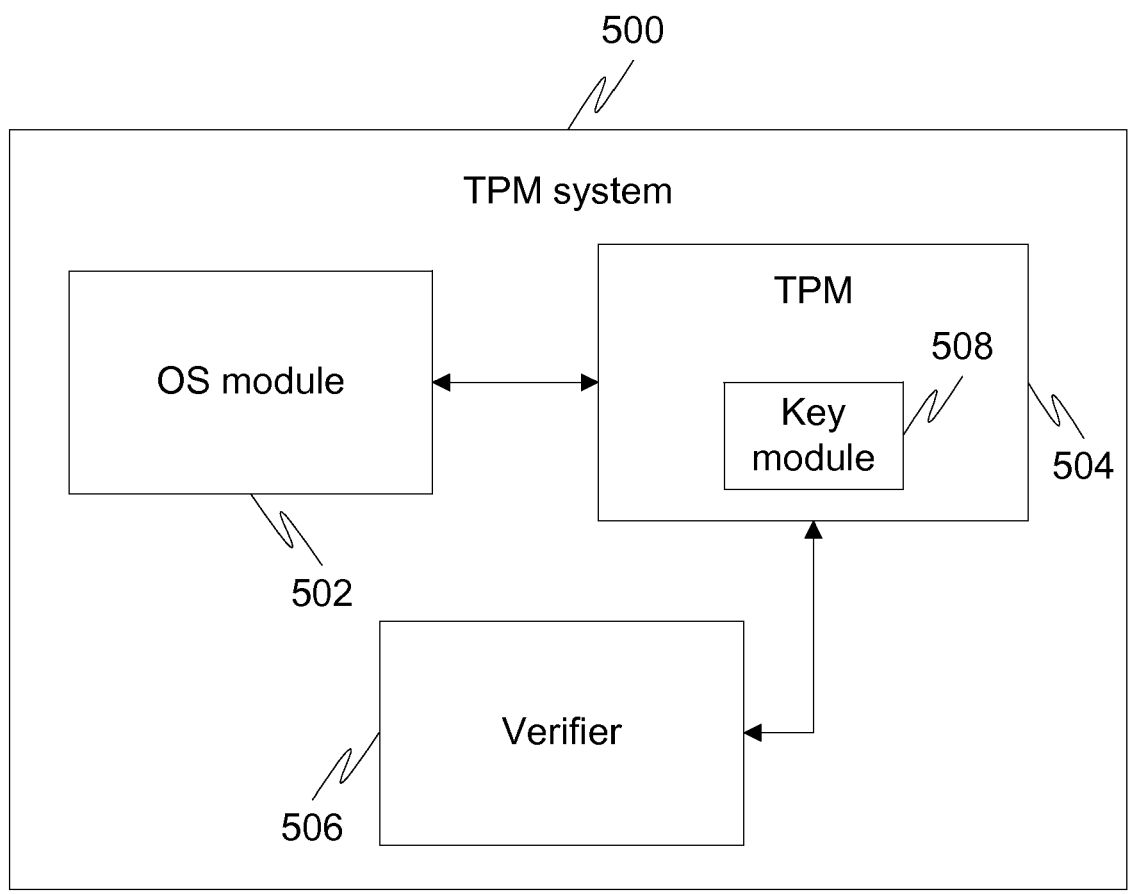
FIG. 5 is a block diagram showing modules of a Trusted Platform Module (TPM) system for verifying authenticity of an application in a computing-platform, in accordance with an embodiment of the present invention.

FIG. 5 is a block diagram showing modules of a Trusted Platform Module (TPM) system 500 for verifying authenticity of an application in computing-platform 102, in accordance with an embodiment of the present invention. The application is executing on computing-platform 102. TPM system 500 includes an OS module 502, a TPM 504, and a verifier 506. OS module 502 computes one or more integrity measurements corresponding to one or more of the application, the plurality of precedent-applications-and the output file. OS module 502 is explained in detail in conjunction with FIG. 6. One or more integrity measurements are generated before the corresponding application is started. The output-file includes the output of the application. Further, each precedent application is executed before the application.

One or more integrity measurements are stored in one or more of a PCR of TPM 504 and in the ML. This has been explained in detail in conjunction with FIG. 2. TPM 504 includes a Key module 508. Key module 508 signs a TPM-quote with a first TPM protected key. TPM 504 generates the TPM-quote. The TPM-quote includes the first concatenated-hash. This has been explained in detail in conjunction with FIG. 3. In an embodiment of the present invention, Key module 508 generates a signed message. The signed message includes the output of the application. This is further explained in detail in conjunction with FIG. 8. The signed message is signed by a second TPM-protected key. The second TPM-protected key corresponds to a second public-key. The second public-key is securely linked to a set of PCR values in a credential of computing-platform 102. The credential is certified by a third TPM-protected key. This has been explained in detail in conjunction with FIG. 4.

Thereafter, verifier 506 compares one or more integrity measurements with recomputed integrity measurements for the application. Verifier 506 is explained in detail in conjunction with FIG. 7 and FIG. 8. Verifier 506 determines the re-computed integrity measurements based on one or more integrity measurements stored in one or more of the PCR of TPM 504 and the ML. Verifier 506 generates the request to verify authenticity of the application.

Figure 6:
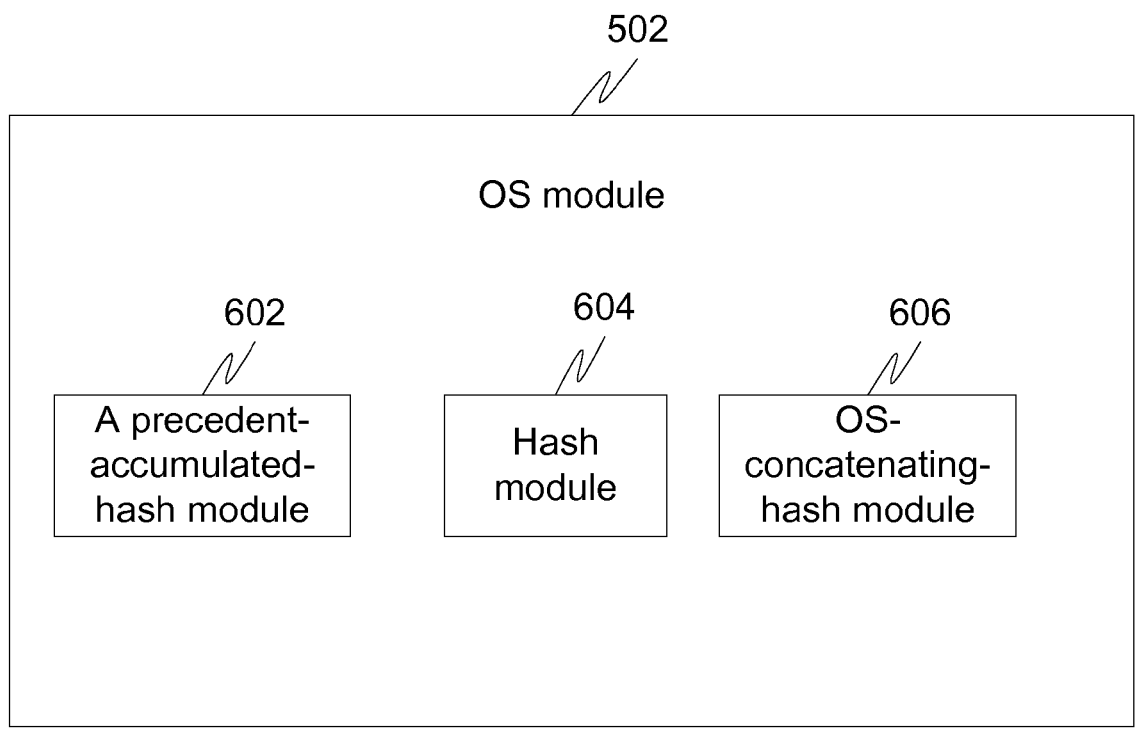
FIG. 6 is a block diagram showing modules of an OS module, in accordance with an embodiment of the present invention.

FIG. 6 is a block diagram showing modules of OS module 502, in accordance I with an embodiment of the present invention. OS module 502 includes a precedent-accumulated-hash module 602, a hash module 604 and an OS-concatenating-hash module 606. Precedent-accumulated-hash module 602 computes the first precedent application-hash corresponding to the plurality of precedent applications and stores the first precedent application-hash in the first PCR of TPM 504.

Hash module 804 computes the output-file hash and the application hash. The output-file hash is computed for the output file and the application hash is computed for the application. Hash module 604 stores the output-file hash and the application hash in the ML. This has been explained in detail in conjunction with FIG. 2.

Thereafter, OS-concatenating-hash module 606 computes a first concatenated-hash corresponding to the output-file hash and the application hash. One or more integrity measurements include output-file hash, the application hash, the first precedent application-hash, and the first concatenated-hash. OS-concatenating-hash module 606 stores the first concatenated-hash in the second PCR of TPM 504. This has been explained in detail in conjunction with FIG. 2.

Figure 7:
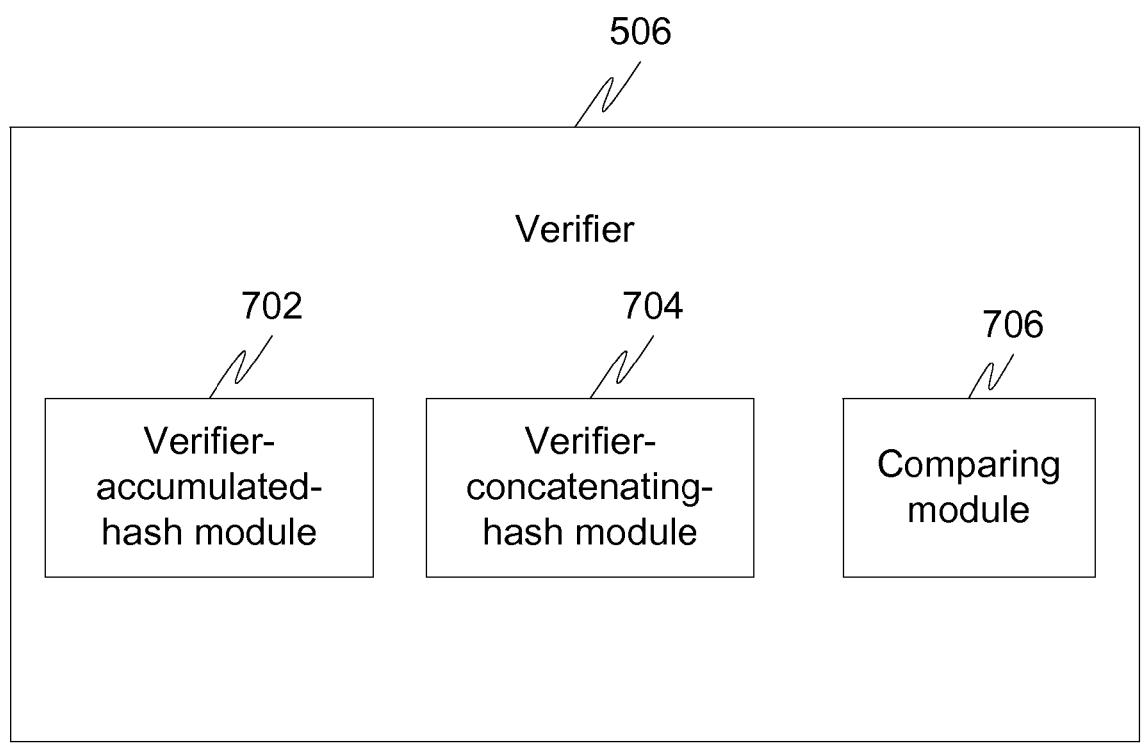
FIG. 7 is a block diagram showing modules of a verifier, in accordance with an embodiment of the present invention.

FIG. 7 is a block diagram showing modules of verifier 506, in accordance with an embodiment of the present invention. Verifier 506 includes a verifier-accumulated-hash module 702. A verifier-concatenating-hash module 704 and a comparing module 706. Verifier-accumulated-hash module 702 computes the second precedent application-hash corresponding to the BIOS-hash, the loader-hash, the OS-hash and hash of each precedent application stored the ML. Thereafter, comparing module 706 compares the second precedent application-hash with the first precedent application-hash. This has been explained in conjunction with FIG. 3.

Verifier-concatenating-hash module 904 computes a second concatenated-hash corresponding to the output-file hash and the application hash stored in the ML. OS module 502 transmits a TPM-quote, and the ML to verifier 506. This has been explained in detail in conjunction with FIG. 3. Additionally OS module 502 transmits one or more credentials of computing-platform 102 to verifier 506. One or more credentials include the first public-key corresponding to the first TPM-protected key.

Thereafter, comparing module 706 verifies the signature with the first TPM-protected-key on the TPM-quote using the first public-key. Comparing module 706 compares the second concatenated-hash with the first concatenated-hash stored in the TPM-quote. This has been explained in conjunction with FIG. 3.

Figure 8:
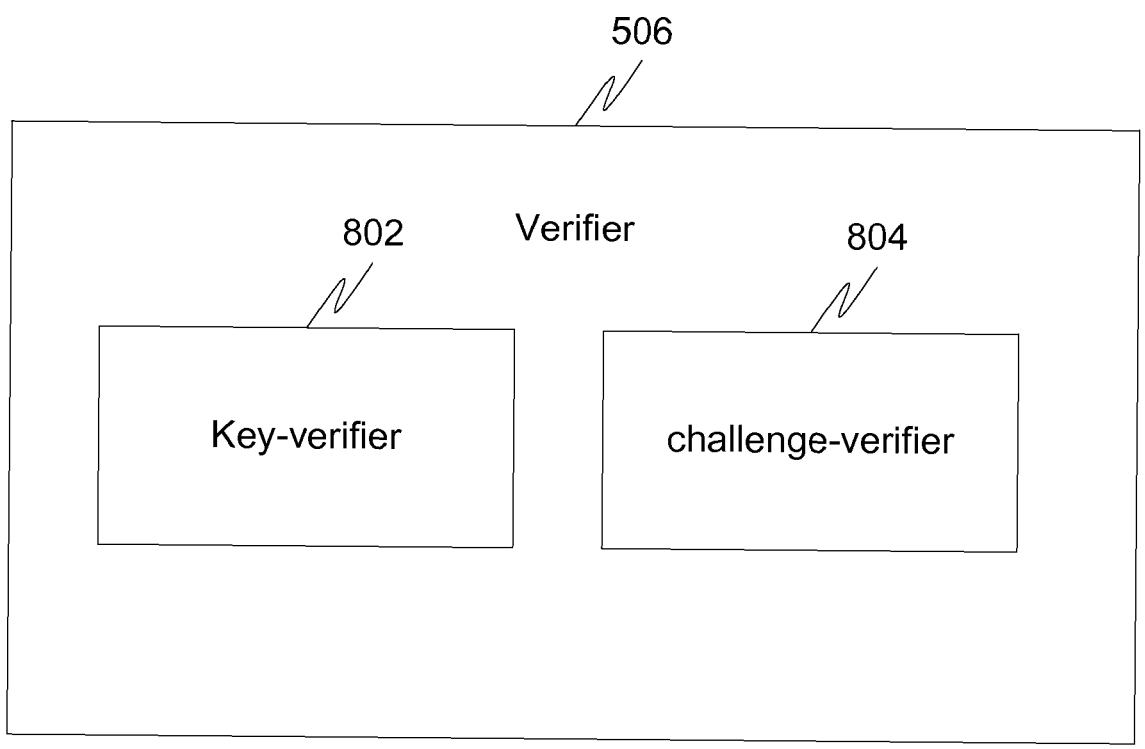
FIG. 8 is a block diagram showing modules of a verifier, in accordance with an embodiment of the present invention.

FIG. 8 is a block diagram showing modules of verifier 506, in accordance with another embodiment of the present invention. Verifier 506 includes a key-verifier 802 and a challenge-verifier 804. Key-verifier 802 verifies the second public-key with the third public-key. The second public-key is verified to confirm association of the second public-key with the set of PCR-values. This has been explained in detail in conjunction with FIG. 4.

Thereafter, challenge-verifier 804 verifies signing of the challenge and the output with the second TPM-protected key using the second public-key. Verifying with the second public-key confirms the signing of the output and the challenge in a configuration of the one or more PCRs. The configuration of one or more PCRs corresponds to the set of PCR values. Further, verifying with the second public-key conforms generation of the output after evoking the challenge. This has been explained in detail in conjunction with FIG. 4.

Figure 9:
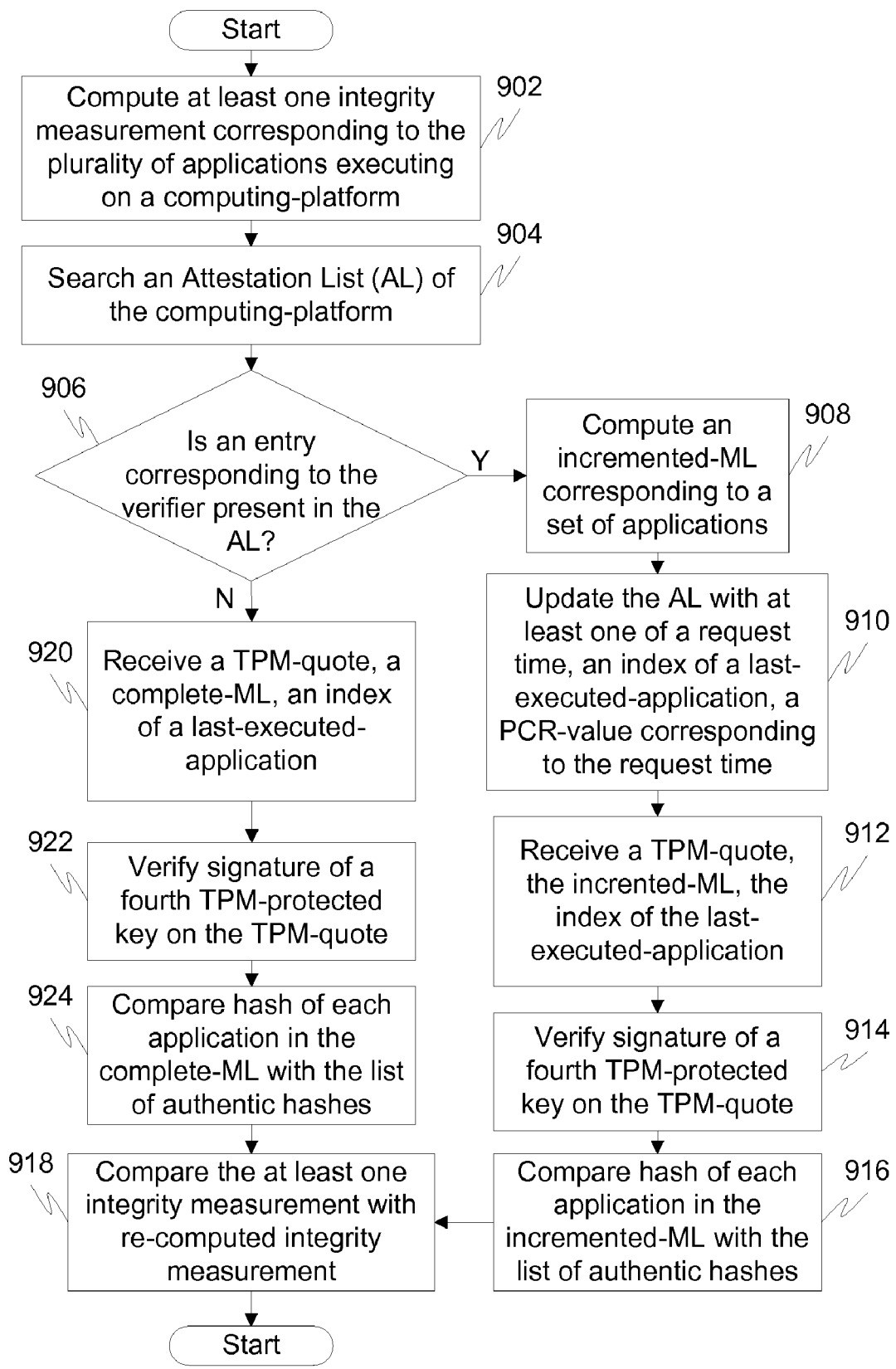
FIG. 9 is a flowchart of a method for verifying authenticity of a computing-platform operating in a TCG domain, in accordance with an embodiment of the present invention.

FIG. 9 is a flowchart of a method for verifying authenticity of computing-platform 102 operating in a TCG domain, in accordance with another embodiment of the present invention. A plurality of applications are executing on computing-platform 102. At step 902, computing-platform 102 computes one or more integrity measurements corresponding to the plurality of applications executing on computing-platform 102. One or more integrity measurements include a first accumulated hash corresponding to the plurality of applications. The first accumulated hash is an accumulated hash of the hash of each application. For example, 'i' applications are executing on computing-platform 102. The applications are represented as A1, A2, A3, . . . , Ai. Therefore, the accumulated-hash for the i applications is equal to H(H(H(H(H(A1)+0)+H(A2))+H(A3)) . . . H(Ai)). The first accumulated hash is stored in a PCR of TPM 106. Computing-platform 102 stores the first accumulated hash of the plurality of applications in a PCR of TPM 106.

After computing one or more integrity measurements, computing-platform 102 searches an Attestation List (AL) of computing-platform 102 at step 904. The AL corresponds to verifier 108. The AL is searched in response to a request generated by verifier 108 for verifying the authenticity of computing-platform 102 at a request time. In an embodiment of the present invention, verifier 108 generates the request periodically after a predetermined time period, which includes random time periods.

Thereafter, at step 906, a check is performed to determine, if an entry corresponding to verifier 108 is present in the AL. An entry of verifier 108 in the AL corresponds to a preceding-request generated by verifier 108 at a preceding request time.

The preceding request time precedes the request time. An entry of verifier 108 in the AL corresponding to the preceding request time includes one or more of the preceding request time, an index of an application that executed last before the preceding-request-time, and a preceding-PCR-value corresponding to the preceding request time. The preceding-PCR-value corresponds to an accumulated hash of the hash of each application executed before the preceding-request time. For example, the preceding-request time of verifier 108 is Tp. Further, n applications, i.e., A1, A2, A3, . . . , An, have executed before Tp. Therefore, an entry of verifier 108 in the AL corresponding to Tp includes, one or more of the Tp, an index of An, and the preceding-PCR-value. The preceding-PCR-value value includes H( . . . H(H(H(H(A1)+0)+H(A2))+H(A3)) . . . H(An)).

Referring back to step 906, if an entry corresponding to verifier 108 is present in the AL, then computing-platform 102 computes an incremented-Measurement log (ML) corresponding to a set of applications at step 908. The incremented-ML includes an execution history of the set of applications. Execution history of the set of applications includes the hash of each application in the set of applications. The plurality of applications include the set of applications. The set of applications is executed on computing-platform 102 during the predetermined time period. The predetermined time period is the difference between the request time and the preceding-request time. For example, the preceding-request time is Tp and the request time T. Further, i applications executed before the request time, where i includes n applications and m applications. The n applications, i.e., A1, A2, . . . , An, are executed on computing-platform 102 before Tp. The m applications, i.e., A (n+1), A (n+2), . . . , A(n+m), are executed on computing-platform 102 between Tp and T. Therefore, execution history in the incremented-ML includes H (A(n+1)), H(A(n+2)), . . . , H(A(n+m)).

After computing the incremented-ML, computing-platform 102 updates the AL with one or more of the request time of verifier 108, an index of a last-executed-application, and a PCR-value corresponding to the request time at step 910. The last-executed-application is executed last before the request time. The PCR-value is the first accumulated hash of the hash of each application executed before the request time. For example, the AL is updated with one or more of the request time T, an index of the last-executed-application, i.e., A(n+m): and the PCR-value, i.e., H( . . . H(H(H(H(A1)+0)+H(A2))+H(A3)) . . . H(An)). Updating the AL with an entry corresponding to the request time of verifier 108 removes the entry of verifier 108 corresponding to the preceding-request time in the AL.

Thereafter, verifier 108 receives a TPM-quote, the incremented-ML, an index of the last-executed-application at step 912. The TPM-quote includes the first accumulated hash. For example, verifier 108 receives a TPM-quote that includes the first accumulated hash, i.e., H( . . . H(H(H(H(A1)+0)+H(A2))+H(A3)) . . . H(An)), the incremented-ML that includes execution history of the set of applications, i.e. H(A(n+1)), H (A(n+2))), . . . , H (A(n+m)), and the index of the last-executed-application, i.e., A(n+m). The TPM-quote is signed with a fourth TPM-protected key. Verifier 108 stores each of the first accumulated hash, the incremented-ML, index of the last-executed-application, and the request time. This information is used by verifier 108 to verify authenticity of computing-platform 102 at a succeeding request time. The succeeding request time succeeds the request time Verifier 108 includes a credential of computing-platform 102. The credential includes a fourth public-key corresponding to the fourth TPM-protected key. Verifier 108 verifies the signature with fourth TPM-protected key on the TPM-quote with the fourth public-key at step 914. Verifying with the fourth public-key confirms that TPM 106 has generated the TPM-quote. Thereafter, at step 916, verifier 108 compares the hash of each application in the incremented-ML with the list of authentic hashes to verify if they correspond to executables modules that verifier 108 trusts.

At step 918, verifier 108 compares integrity measurements that include the first accumulated hash with re-computed integrity measurements. The re-computed integrity measurement is computed from the execution history of the set of applications stored in the incremented-ML. The re-computed integrity measurement includes a second accumulated hash. Verifier 108 computes the second accumulated hash corresponding to each of the hash of each application stored in the incremented-ML and the precedent-PCR-value. Thereafter, verifier 108 compares the second accumulated hash with the first accumulated hash received in the TPM-quote. If the second accumulated hash is equal to the first accumulated hash, then computing-platform 102 is authentic. However, if the second accumulated hash is not equal to the first accumulated hash, then computing-platform 102 is not authentic. For example, the hash of each application stored in the incremented-ML is represented as H (A(n+1)), H (A(n+2)), ..., H (A(n+m)), and the precedent-PCR-value is represented as H(... H(H(H(H(A1)+0)+H(A2))+H(A3)) ... H(An)). Verifier 108 computes the second accumulated hash as H( ... H(H(H(H(A1)+0)+H(A2))+H(A3)) ... H(Ai)) corresponding to A(n+1)), H(A(n+2)), ..., H(A(n+m) and H(A), H (A2), ..., H (An), as m+n is equal to i. Further, the first accumulated hash received in the TPM-quote is represented as. Thereafter, verifier 108 compares the second accumulated hash with the H( ... H(H(H(H(A1)+0)+H(A2))+H(A3)) ... H(Ai)) first accumulated hash.

Therefore, the size of the ML to be transmitted from computing-platform 102 to verifier 108 is reduced each time verifier 108 generates a request to verify authenticity of on computing-platform 102.

Referring back to step 906, if an entry corresponding to verifier 108 is absent in the AL, then verifier 108 receives a TPM-quote, a complete-ML at step 920. The complete-ML includes hash of each application executed before the request time. For example, the complete-ML includes H (A1), H (A2), ..., H (Ai). Thereafter, verifier 108 verifies the signature with fourth TPM-protected key on the TPM-quote with the fourth public-key at step 922. At step 924, verifier 108 compares the hash of each application in the complete-ML with the list of authentic hashes to verify if they correspond to executables/modules that verifier 108 trusts.

Thereafter, the step 918 is performed. The re-computed integrity measurement is computed from the execution history of the plurality applications stored in the complete-ML. The re-computed integrity measurement includes a third accumulated hash. Verifier 108 computes the third accumulated hash corresponding to the hash of each application stored in the complete-ML. Thereafter, verifier 108 compares the third accumulated hash with the first accumulated hash received in the TPM-quote. If the third accumulated hash is equal to the first accumulated hash computing-platform 102 is authentic. However, if the third accumulated hash is not equal to the first accumulated hash, then computing-platform 102 is not authentic. For example, verifier 108 computes the third accumulated hash as, H( ... H(H(H(A1)+0)+H (A2))+H(A3)) ... H(An)) corresponding to the hash of each application stored in the complete-ML. Further the first accumulated hash received in the TPM-quote is represented as H(... H(H(H(H(A1)+0)+H(A2))+H(A3))...H(An)). Thereafter, verifier 108 compares the third accumulated hash with the first accumulated hash.

Figure 10:
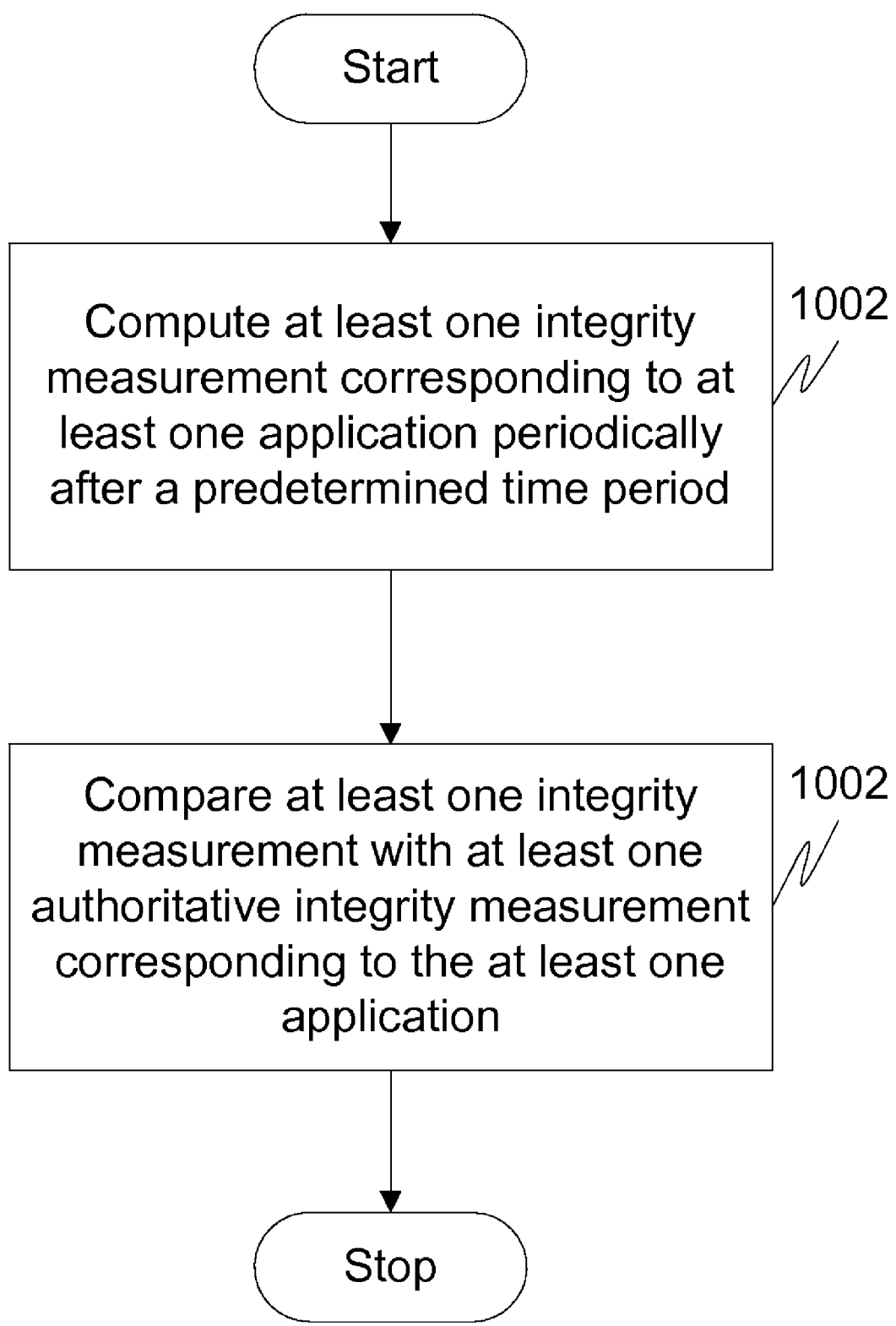
FIG. 10 is a flowchart of a method for verifying authenticity a computing-platform in a TCG domain, in accordance with another embodiment of the present invention.

FIG. 10 is a flowchart of a method for verifying authenticity of one or more applications in computing-platform 102 in a TCG domain, in accordance with an embodiment of the present invention. At step 1002, one or more integrity measurements corresponding to one or more applications are computed periodically after a predefined time period. Each application is stored on computing-platform 102. Each application is selected for computing one or more integrity measurement based on a predefined criterion. In an embodiment of the present invention, the predefined criterion is that one or more integrity measurements are computed for executable of an application. In another embodiment of the present invention, the predefined criterion is that applications saved in a predefined set of directories corresponding to one or more applications are selected for computing one or more integrity measurements. In another embodiment of the present invention, each file associated with one or more applications that have a predetermined extension are selected for computing one or more integrity measurements. One or more integrity measurements include a fourth accumulated hash. The fourth accumulated hash is computed corresponding to each application stored on computing-platform 102. For example, if n applications A1, A2, A3, ..., An are stored on computing-platform 102. Therefore, the fourth accumulated hash corresponds to H( ... H(H(H(H(A1)+0)+H(A2))+H(A3)) ... H(An))

Thereafter, at step 1004, one or more integrity measurements with one or more authoritative integrity measurements corresponding to each application. An authoritative measurement of an application is provided by a manufacturer of the corresponding application. In an embodiment of the present invention, one or more authoritative integrity measurements are stored in computing-platform 102. Therefore, computing-platform 102 compares one or more integrity measurements with one or more integrity measurements with one or more authoritative integrity measurements of a corresponding application. In another embodiment of the present invention, one or more authoritative integrity measurements are stored in verifier 108. Therefore, verifier 108 compares one or more integrity measurements with one or more authoritative integrity measurements of a corresponding application. If one or more integrity measurements are similar to one or more authoritative integrity measurements, then each application stored on computing-platform 102 is authentic. However, if one or more integrity measurements are different from one or more authoritative integrity measurements, then one or more applications stored on computing-platform 102 are not authentic.

The method for verifying authenticity of an application in a computing-platform operating in a Trusted Computing Group (TCG) domain, as described in the present invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the present invention.

The computing device executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the computing device to perform specific tasks such as the steps that constitute the method of the present invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the computing device may be in response to user commands, or in response to results of previous processing or in response to a request made by another computing device.

Various embodiments of the present invention provide a method and system, in which authenticity of one or more applications executing on the computing-platform, the output of one or more applications, and the computing-platform is verified efficiently and securely. Further, various embodiments of the present invention provide a method and system to execute an incremented attestation of one or more applications executing on the computing-platform. The incremented attestation enables reduction of the communication overhead between a computing-platform and a verifier.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

That which is claimed is:

1. A method for verifying authenticity of an application in a computing-platform operating in a Trusted Computing Group (TCG) domain, the method comprising:
    computing at least one integrity measurement corresponding to at least one of the application, a plurality of precedent-applications, and an output file, wherein the output file comprises an output of the application, the application is executing on the computing-platform, wherein each precedent-application is executed before the application; and
    comparing at least one integrity measurement with re-computed integrity measurements, wherein the re-computed integrity measurements are determined corresponding to at least one of the application, the computing-platform and the plurality of precedent-applications; and
    wherein at least one integrity measurement comprises:
        an output-file hash, wherein the output-file hash is computed for the output file of the application;
        an application hash, wherein the application hash is computed for the application;
        a first concatenated-hash corresponding to the output-file hash and the application hash; and
        a first precedent application-hash, wherein the first precedent application-hash is an accumulated hash of the plurality of precedent-applications.

2. The method of claim 1, wherein the step of computing at least one integrity measurement comprises:
    storing the precedent application hash in a first Platform Configuration Register (PCR) of the TPM; and
    storing the output-file hash and the application hash in the Measurement Log (ML) and storing the first concatenated-hash in a second PCR of a TPM.

3. The method of claim 2, wherein the first PCR is dedicated for storing the first concatenated-hash.

4. The method of claim 3, wherein the step of comparing comprises receiving one or more of a TPM-quote and the ML in response to a request generated for verifying authenticity of the application, the TPM-quote being generated by the TPM, the TPM-quote comprising the first concatenated-hash, the TPM-quote being signed with a first TPM-protected key.

5. The method of claim 4, wherein the re-computed integrity measurements corresponding to the application comprise a second concatenated-hash, the second concatenated-hash being computed corresponding to the output-file hash and the application hash stored in the ML.

6. The method of claim 5, wherein the second concatenated-hash is compared with the first concatenated-hash stored in the TPM-quote.

7. The method of claim 6, wherein signing of the TPM-quote with a first TPM-protected key is verified with a first public-key corresponding to the first TPM-protected key, the first public-key is certified in at least one credential corresponding to the computing-platform.

8. The method of claim 1, wherein at least one integrity measurement is a signed message, the signed message comprises the output of the application, wherein the signed message is signed by a second TPM-protected key, the second TPM-protected key corresponds to a second public-key, wherein the second public-key is securely linked to a set of PCR values in a credential of the computing-platform, the credential is certified by a third TPM-protected key.

9. The method of claim 8, wherein the signed message comprises a challenge, wherein the challenge is evoked to the application, the challenge is evoked to verify whether the output of the application is generated after evoking the challenge, wherein the challenge is evoked before generating a request for verifying authenticity of the application.

10. The method of claim 9, wherein the step of comparing comprises:
    receiving at least one credential of the computing-platform, wherein at least one credential comprises a third public-key, the second public-key and set of PCR values, the third public-key is signed by an authority key, the second public-key and the set of PCR values are signed by the third TPM-protected key, wherein the third TPM-protected key corresponds to the third public-key;
    verifying a signature with the third TPM-protected key on association the second public key with the set of PCR values using the third public-key, wherein the signature with the third TPM-protected key is verified to confirm association of the second public-key with the set of PCR values; and
    verifying a signature with the second TPM-protected key on the signed message using the second public-key, wherein verifying with the second public-key confirms the signing of the output and the challenge in a configuration of at least one PCR, the configuration of at least one PCR corresponds to the set of PCR values.

11. The method of claim 10, wherein verifying with the second public-key confirms generation of the output after evoking the challenge.

12. A Trusted Platform Module (TPM) system for verifying authenticity of an application in a computing-platform, the TPM system comprising:
    a memory; and
    at least one processor configured to implement:
        an Operating System (OS) module, wherein the OS module computes at least one integrity measurement corresponding to at least one of the application, a plurality of precedent-applications and an output file, wherein at least one integrity measurement is generated in response to a request generated to verify authenticity of the application, the output file comprises an output of the application, the application is executing on the computing-platform, wherein each precedent-application is executed before the application;

a TPM, wherein the TPM stores at least one integrity measurement in at least one of a Platform Configuration Register (PCR) of the TPM and a ML; and a verifier, wherein the verifier compares at least one integrity measurement with re-computed integrity measurements for the application, the re-computed integrity measurements are determined by the verifier based on at least one integrity measurement stored in at least one of a PCR of the TPM and the ML, the request to verify authenticity of the application is generated by the verifier; and wherein the OS module comprises:

a hash module, wherein the hash module computes an output-file hash and an application hash, the hash module stores the output-file hash and the application hash in the ML, wherein the output-file hash is computed for the output file and the application hash is computed for the application;

an OS-concatenating-hash module, wherein the OS-concatenating-hash module computes a first concatenated-hash corresponding to the output-file hash and the application hash, the first concatenated-hash is stored in a second PCR of the TPM; and a precedent-accumulated-hash module, wherein the precedent-accumulated-hash module computes a first precedent application-hash corresponding to die plurality of precedent-applications, the first precedent application-hash is stored in a first PCR of the TPM, wherein at least one integrity measurement comprises the output-file hash, the application hash, the first concatenated-hash, and the first precedent application-hash.

13. The TPM system of claim 12, wherein the TPM comprises a key module, wherein the key module signs a TPM Quote with a first TPM protected key, wherein the TPM quote comprises the first concatenated-hash, the TPM quote is generated by the TPM.

14. The TPM system of claim 13, wherein the verifier comprises:

a verifier-concatenating-hash module, wherein the verifier-concatenating-hash module computes a second concatenated-hash corresponding to the output-file hash and the application hash stored in the ML, wherein the ML is transmitted to the verifier by the OS module; and a comparing module, wherein the comparing module compares the second concatenated-hash with the first concatenated-hash stored in the TPM quote, the comparing module checks whether the TPM quote is signed by the first TPM protected key, the TPM quote is transmitted to the verifier by the OS module.

15. The TPM system of claim 14, wherein at least one credential of the computing-platform is transmitted by the OS module to the verifier, the comparing module verifies signing of the TPM-quote with a first TPM-protected key with a first public-key corresponding to the first TPM-protected key, the first public-key is certified in at least one credential corresponding to the computing-platform.

16. The TPM system of claim 13, wherein the key module generates a signed message, the signed message comprises the output of the application, wherein the signed message is signed by a second TPM-protected key, the second TPM-protected key corresponds to a second public-key, wherein the second public-key is securely linked to a set of PCR values in a credential of the computing-platform, the credential is certified by a third TPM-protected key.

17. The TPM system of claim 16, wherein the verifier comprises:

a key-verifier, wherein the key-verifier verifies a signature with the third TPM-protected key on association the second public key with the set of PCR values using the third public-key, wherein the signature with the third TPM-protected key is verified to confirm association of the second public-key with the set of PCR values; and a challenge-verifier, wherein the challenge-verifier verifies a signature with the second TPM-protected key on the signed message using the second public-key, wherein verifying with the second public-key confirms the signing of the output and the challenge in a configuration of at least one PCR, the configuration of at least one PCR corresponds to the set of PCR values verifying with the second public-key confirms generation of the output after evoking the challenge.

18. A computer program product comprising a non-transitory computer usable medium embodying computer usable code for verifying authenticity of an application in a computer system, said computer program product comprising:

computer usable program code for computing at least one integrity measurement corresponding to at least one of the application, a plurality of precedent-applications, and an output file, wherein the output file comprises an output of the application, the application is executing on the computing-platform, wherein each precedent-application is executed before the application; and computer usable computer code for comparing at least one integrity measurement with re-computed integrity measurements, wherein the re-computed integrity measurements are determined corresponding to at least one of the application, the computing-platform, and the plurality of precedent-applications; and wherein at least one integrity measurement comprises:

an output-file hash, wherein the output-file hash is computed for the output file of the application;

an application hash, wherein the application hash is computed for the application;

a first concatenated-hash corresponding to the output-file hash and the application hash; and a first precedent application-hash, wherein the first precedent application-hash is an accumulated hash of the plurality of precedent-applications.

19. A method for verifying authenticity of a computing-platform operating in a Trusted Computing Group (TCG) domain, a plurality of applications are executing on the computing-platform, the method comprising:

computing at least one integrity measurement corresponding to the plurality of applications executing on the computing-platform;

searching an Attestation List (AL) of the computing-platform to determine if an entry corresponding to a verifier is present in the AL, wherein the AL corresponds to the verifier;

computing an incremented-Measurement-log (ML) corresponding to a set of applications, if an entry corresponding to the verifier is present in the AL, wherein the incremented-ML comprises an execution history of a set of applications, the plurality of applications include the set of applications, wherein the set of applications is executed on the computing-platform during a predetermined time period; and comparing at least one integrity measurement with recomputed-integrity measurements, wherein the re-computed integrity measurements is computed from the execution history of the set of applications stored in the incremented-ML.

20. The method of claim 19, wherein the verifier generates a request for verifying authenticity of the computing-platform at a request time.

21. The method of claim 20, wherein the request is generated by the verifier periodically after the predetermined time period.

22. The method of claim 20, wherein the AL corresponding to the verifier is searched in response to the request for verifying authenticity of the computing-platform.

23. The method of claim 21, wherein an entry of the verifier in the AL corresponds to a preceding-request generated by the verifier at a preceding request time, the preceding-request time precedes the request time.

24. The method of claim 23, wherein the predetermined time period is a difference between the request time and the preceding request time.

25. The method of claim 24, wherein the AL is updated with at least one of:
   the request time of the verifier;
   an index of a last-executed-application, wherein the last-executed-application is executed last before the request time; and
   a Platform Configuration Register (PCR)-value, wherein the PCR-value is a first accumulated hash of the hash of each application executed before the request time.

26. The method of claim 25, wherein the at least one integrity measurement comprises an accumulated hash of the plurality of applications, the plurality of applications have executed before the request time of the verifier.

27. The method of claim 26, wherein the first accumulated hash of the plurality of applications is stored in a PCR of a TPM.

28. The method of claim 27, wherein the step of comparing comprises receiving:
   a TPM-quote, wherein the TPM quote comprises the first accumulated hash, the TPM-quote is signed by a fourth TPM-protected key;
   the incremented-ML, wherein the execution history of the set of applications includes hash of each application in the set of applications; and
   the index of the last-executed-application, wherein the last-executed-application is executed last before the request time.

* * * * *